United States Patent
Collins et al.

(10) Patent No.: US 6,726,443 B2
(45) Date of Patent: Apr. 27, 2004

(54) MICROMACHINES

(75) Inventors: Ralph David Collins, Hawthorn (AU); Bernard Raymond Mace, Hawthorn (AU)

(73) Assignee: Micromachines Ltd., Victoria (AU)

( * ) Notice: Subject to any disclaimer, the term of this patent is extended or adjusted under 35 U.S.C. 154(b) by 0 days.

(21) Appl. No.: 10/157,934

(22) Filed: May 31, 2002

(65) Prior Publication Data

US 2002/0195886 A1 Dec. 26, 2002

Related U.S. Application Data

(63) Continuation of application No. PCT/AU00/01495, filed on Dec. 4, 2000.

(30) Foreign Application Priority Data

Dec. 2, 1999 (AU) .............................................. PQ4462

(51) Int. Cl.⁷ .................................................. F01D 1/36
(52) U.S. Cl. ............................................ 415/90; 416/4
(58) Field of Search .............................. 415/90; 416/4; 310/52, 61, 40 MM; 290/52

(56) References Cited

U.S. PATENT DOCUMENTS

| 1,061,142 A | 5/1913 | Tesla .......................... 415/90 |
| 1,061,206 A | 5/1913 | Tesla .......................... 415/90 |
| 4,534,699 A | * 8/1985 | Possell ........................ 415/42 |
| 5,685,062 A | 11/1997 | McCarthy et al. ............ 29/598 |

FOREIGN PATENT DOCUMENTS

| EP | 0 725 451 A1 | 8/1996 |
| WO | 90/02643 | 1/1998 |
| WO | 90/07223 | 6/1998 |

* cited by examiner

Primary Examiner—Edward K. Look
Assistant Examiner—Dwayne J. White
(74) Attorney, Agent, or Firm—Birch, Stewart, Kolasch & Birch, LLP

(57) ABSTRACT

A micromachine including at least one bladeless rotor, said rotor being adapted to impart energy to device energy to or derive energy from a fluid. A rotor for a micromachine comprising at least a pair of closely spaced co-axially aligned discs defining opposed planar surfaces, at least one disc having at least one aperture whereby a fluid passageway is defined between the aperture, the planar surfaces and the periphery of the rotor, the rotor being formed of a single crystal material.

41 Claims, 8 Drawing Sheets

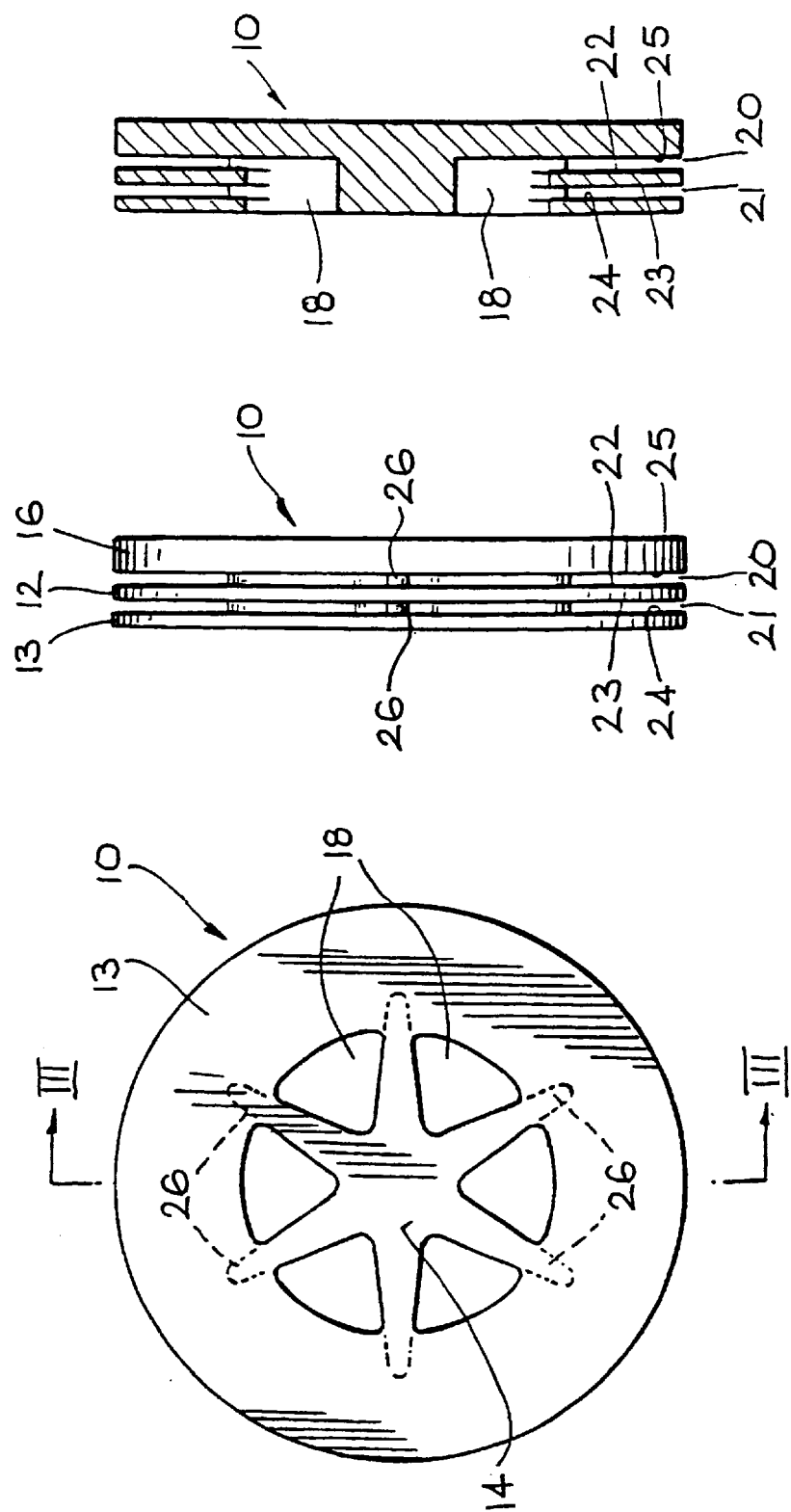

MICROMACHINES

This is a continuation of application No. PCT/AU00/01495, filed Dec. 4, 2000.

FIELD OF THE INVENTION

This invention relates to micromachines and an improved rotor for micromachinery. The term micromachine is used to embrace many types of very small turbines or compressors. These machines can be as small as 12 mm in diameter with rotors of 4 mm in diameter.

BACKGROUND

Micromachines such as micro-gas turbines, combustion power generators, pumps and compressors are described in U.S. Pat. No. 5,932,940 (the M.I.T. patent), the disclosure of which is incorporated herein by reference. All of these machines contain a rotor comprising a disc or discs defining either a centrifugal compressor/pump or a radial inflow turbine. The material of construction is characterised by a strength to density ratio enabling a rotor speed of at least 500,000 rotations per minute. The machines are constructed using microfabrication techniques including vapour deposition and bulk wafer etching, the material of construction being common to all the structural elements.

The compressor and the turbine rotors of the devices described in the M.I.T. patent utilise a plurality of radial flow vanes. It is considered that this arrangement of blades is not desirable in micromachines for the following reasons:

(a) because the nature of construction involves planar fabrication techniques, fillets on corners are difficult to achieve and, in the absence of adequate fillets, high stress concentration at the blade root attachment decreases the fracture strength of these microelements;

(b) the placement of blades around the periphery of the discs increases the mass of the structure at the place where centrifugal stresses have the greatest effect;

(c) the plurality of blades tends to set up undesirable turbulence and pulsations in the working fluids, and the cyclic nature of the reaction between fluids & blades results in cyclic stress fluctuations (fatigue stresses) that limit the durability (fatigue life) of the rotor assembly;

(d) the maximum rotor speed is limited in part by the allowable mechanical and thermal stresses that may be imposed on the rotor structure by the plurality of radial flow vanes;

(e) the degree of rotor balance obtainable is affected by the requirement for a plurality of radial flow vanes; and (f) the rotor disc employs blades only on one side and is subject to a bending moment, caused by centrifugal blade loading.

It is these problems that have brought about the present invention to use a bladeless or vaneless rotor in micromachines.

The use of bladeless rotors has been suggested in the context of "large scale" turbines. Thus, a method for driving turbines by means of viscous drag was taught by Tesla in U.S. Pat. No. 1,061,206 and for fluid propulsion in U.S. Pat. No. 1,061,142. In both disclosures the rotor comprises a stack of flat circular discs with openings in the central portions, with the discs being set slightly apart. In the turbine embodiment the rotor is set in motion by the adhesive and viscous action of the working fluid, which enters the system tangentially at the periphery and leaves it at the center. In the fluid propulsion embodiment, fluid enters the system at the center of the rotating discs and is transferred by means of viscous drag to the periphery where it is discharged tangentially.

For fluid propulsion applications such as pumps and compressors, the fluid is forced into vortex circulation around a central point where a pressure gradient is created. This pressure gradient is such that an increasing radial distance from the center of rotation leads to an increase in pressure, with the density of the fluid and the speed of rotation determining the rate of pressure rise. If an outwardly radial flow is superimposed on the vortex circulation an increasing pressure is imposed on the fluid as it flows outwardly.

To preserve the vortex circulation, an external force must act upon the fluid, and this force must accelerate the fluid in the tangential direction as the fluid moves outwardly in order to maintain its angular velocity. This function is simply a transfer of momentum from the impeller to the fluid, and with a centrifugal compressor it may be achieved in one of two ways. A first method is to confine the fluid within a fixed boundary channel and then accelerate the channel. In an impeller of the type utilized in prior art microturbomachinery, the vanes and rotor walls form such a channel, and acceleration occurs as the fluid moves outwardly towards regions of higher impeller velocity. A second method of momentum transfer is by viscous drag and this is the principle underlying the Tesla arrangement described in the two US patents referred to above. Viscous drag always acts to reduce the velocity difference, so that in the case of a compressor where the channel walls are moving relative and parallel to the fluid, the fluid will accelerate in the direction of the channel motion. Conversely, where the fluid is moving relative and parallel to the channel walls, the channel walls will accelerate in the direction of the fluid motion.

Known bladeless or vaneless rotors have had limited success in large scale turbines. The relatively large number of parts required for their construction and the distortion of the discs that occur under high thermal and mechanical stress conditions have restricted their adoption.

It is these issues that have brought about the present invention.

SUMMARY OF THE INVENTION

According to one aspect of the present invention there is provided a micromachine including at least one bladeless rotor, said rotor being adapted to impart energy to or derive energy from a fluid.

For the micromachine, the rotor of the invention may have a disc of diameter no greater than 20 mm.

Preferably the rotor includes a shaft centrally supporting at least two closely spaced planar discs, the discs having opposed surfaces defining a fluid passageway. At least one of the discs may have one or more apertures to allow fluid to pass into or out of the fluid passageway. The apertures preferably are close to a central region of the disc. There may be two or more apertured discs, with the apertures of each disc being aligned with those of the other disc. Preferably the discs are separated by spacers.

The rotor of the invention may have a backing disc supporting a plurality of annular discs in a closely spaced coaxial array. In that arrangement, each annular disc may be mounted to the backing disc or an adjacent disc by an array of spacers. The backing disc preferably is mounted coaxially on a shaft.

The micromachine, including its rotor, preferably has a vaned stator positioned around the periphery of the bladeless rotor.

The micromachine preferably is made of material capable of operating at temperature greater than 1000° C. The rotor most preferably is made of a material having a tensile strength to allow the rotor to run at speeds greater than 500,000 rpm at elevated temperatures associated with combustion. The rotor may be made of a single crystal material. The rotor may, for example, be formed at least in part from a material selected from silicon, silicon carbide, silicon coated with silicon carbide, and silicon coated with silicon nitride.

The rotor preferably is formed by a microfabrication technique, such as photolithography or vapour deposition.

According to a further aspect of the present invention there is provided a rotor for a micromachine, wherein the rotor includes at least a pair of closely spaced co-axially aligned discs defining opposed planar surfaces, at least one disc having at least one aperture whereby a fluid passageway is defined between the aperture, the planar surfaces and the periphery of the rotor, and wherein the rotor is bladeless and is formed of a single crystal material.

In accordance with a still further aspect of the present invention there is provided a rotor for a micromachine, wherein the rotor includes at least a pair of closely spaced co-axially aligned discs defining opposed planar surfaces, at least one disc having at least one aperture whereby a fluid passageway is defined between the aperture, the planar surfaces and the periphery of the rotor, and wherein the rotor is bladeless and manufactured of a material having a tensile strength to allow the rotor to run at speeds greater than 500,000 rpm at elevated temperatures associated with combustion.

In accordance with a still further aspect of the present invention there is provided a rotor, wherein the rotor includes a backing disc and at least one coaxially spaced annular disc supported on the backing disc by a central hub defining at least one aperture, wherein the rotor is bladeless and the annular disc defines an unimpeded fluid passage between the aperture and the periphery of the disc.

The rotor of the invention most preferably is of unitary construction. The rotor preferably is formed by a microfabrication technique, such as photolithography or vapour deposition.

DESCRIPTION OF THE DRAWINGS

Embodiments of the invention will now be described by way of example only with reference to the accompanying drawings in which:

FIG. 1 is a front elevational view of a first embodiment of a bladeless rotor for use in a micromachine, FIG. 2 is a side elevational view of the bladeless rotor of FIG. 1, FIG. 3 is a cross sectional view taken along the lines III—III of FIG. 1.

DESCRIPTION OF THE PREFERRED EMBODIMENT

Figure 6:
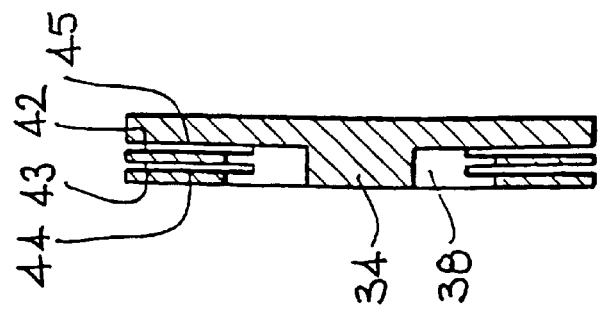
FIG. 6 is a sectional view of the rotor, taken through the lines VI—VI of FIG. 4.

In U.S. Pat. No. 5,932,940 (the M.I.T. patent) there is disclosure of micromachinery in the form of micro-gas turbines and associated microcomponentry. The components such as the compressor, diffusers, combustion chambers, turbine rotors and stators are all disclosed as being manufactured using microfabrication techniques in a material that is common to all the elements. Suitable materials include a range of ceramics used in the semiconductor art or in the microelectronic fields, such materials include silicon, silicon carbide and silicon nitride. Other suitable materials include refractory metals and alloys based on nickel, tantalum, iridium and rhenium. Composite materials such as molybdenum silicide are also envisaged. The materials can also vary depending on whether they are used in the hot and cold regions of the micromachines. Such techniques and materials are suitable for use with a rotor and a micromachine according to the invention.

Regardless of whether the engine is a turbine or compressor it includes at least one rotor usually mounted on a shaft. In one embodiment the engine could include a common shaft driving a compressor disc at one end, defining a centrifugal compressor and a turbine disc at the opposite end defining a radially inflow turbine. The componentry is very small with the whole assembly being less that 20 mm in diameter. The micromachines are designed to run at very high speeds with a rotational speed of at least 500,000 rotations per minute being typical. In a preferred embodiment the dimensions of the machine embraces compressor and turbine discs of diameters between 1 and 20 mm with a combustion chamber having a height of between 2 to 10 mm and the axial length of the combustion chamber being between 0.5 mm and 12 mm. The materials that are used to produce the componentry should preferably be able to withstand temperature of at least 1,000° C. in the case of turbines. Again, these considerations apply similarly to a rotor and a micromachine according to the present invention, as will be evident from the following.

The micromachine disclosed in the M.I.T. patent utilises bladed or vaned rotors. As discussed in the introduction of the present specification, it is considered that the use of a bladed or vaned rotor in micromachinery causes a series of problems, many of which can be solved by the use of bladeless or vaneless rotors.

In the embodiment shown in FIGS. 1 to 3, a suggested construction of a bladeless rotor 10 is illustrated. The bladeless or vaneless rotor 10 shown in FIGS. 1 to 3 includes two substantially smooth and planar annular discs or rings 12 and 13 co-axially supported in a close parallel array by a star shaped hub 14 which is attached to a backing disc 16.

The hub 14 is provided with openings/apertures 18 that communicate with the space 20 between backing disc 16 and the ring 12 and with the space 21 between ring 12 and ring 13. In the example shown the rotor has a diameter of about 4 mm and a width of about 0.6 mm. The rotor is constructed from material such as silicon, silicon carbide or other suitable material and is manufactured preferably as a sub assembly of prior art microturbomachinery and by means compatible with the manufacture of associated microturbomachine components.

The spaces 20 and 21 form fluid passageways from opening 18 to the periphery of the rings 12 and 13. The fluid passageways are defined by four surfaces 22, 23, 24 and 25 over which the fluid flows, namely opposing surfaces 23 and 24 of the rings 12 and 13 and the opposing surfaces 22 and 25 of the ring 12 and backing disc 16.

Figure 5:
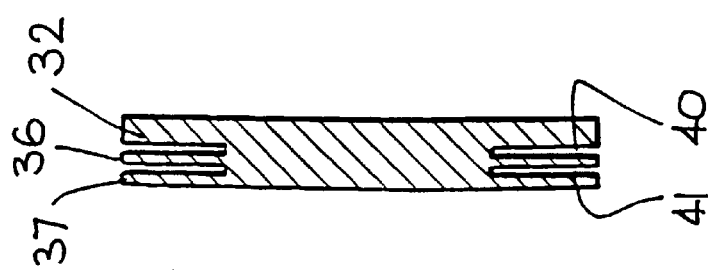
FIG. 5 is a sectional view of the rotor, taken through the lines V—V of FIG. 4.
Figure 4:
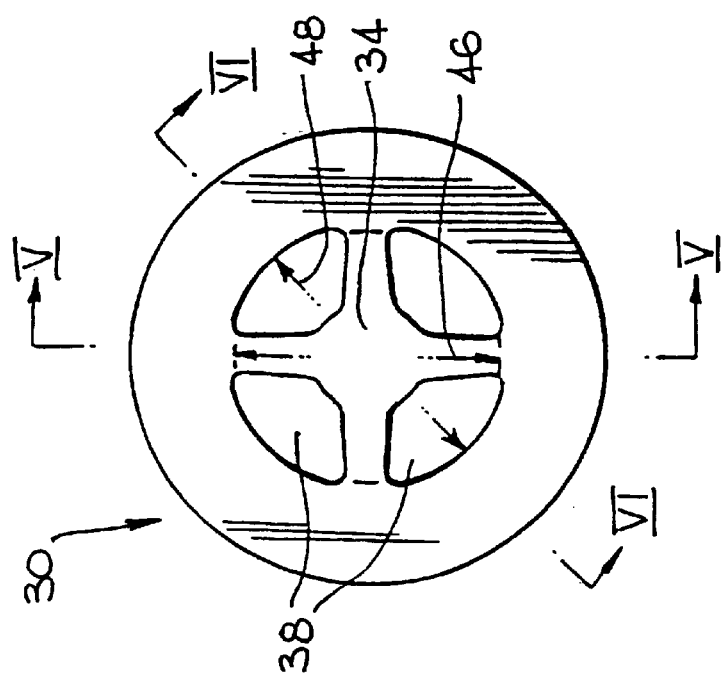
FIG. 4 is a front elevational view of a second embodiment of a bladeless rotor.

In FIGS. 4 to 6, a second embodiment of a micromachine rotor 30 is illustrated. In rotor 30, a backing disc 32, supports a cross shaped hub 34 upon which are supported in close parallel array two smooth and substantially planar annular discs or rings 36 and 37. The hub 34 is provided with openings 38 that are in fluid connection with the space 40 between backing disc 32 and ring 36 and with space 41 between ring 36 and ring 37. The spaces 40 and 41 form fluid passageways from openings 38, to the periphery of the rings 36 and 37. The fluid passageways are defined by four surfaces 42, 43, 44 and 45, namely opposing surfaces 43 and 44 of the rings 36 and 37, and the opposing surfaces 42 and 45 of the ring 36 and the backing disc 32. The inner diameter 46 of the spaces 40 and 41, is smaller than the outer diameter 48 of the openings 38. This arrangement allows an unimpeded flow of the vortex circulation of the fluid within the fluid passageways formed by the spaces 40 and 41 and within the openings 38. In this embodiment the rotor has a diameter of about 4 mm and a width of about 0.6 mm.

Construction of the rotor 10 of FIGS. 1 to 3 and rotor 41 of FIGS. 4 to 6 may be accomplished by means of microfabrication techniques in common usage such as photolithography and masking layers. In the case where silicon is the material of construction, deep trench etch processes employing anistropic plasma etching steps alternating with polymerizing steps may also be employed. Such a process is described in U.S. Pat. No. 5,501,893 and is available from Surface Technology Systems Ltd. of Imperial Park, Newport U.K. However, other etching techniques can be employed, and preferably the etchant and chemistry employed are capable of producing deep trench geometries having high aspect ratios. Other manufacturing techniques may also be employed, particularly when the material of construction is silicon carbide, in which case components may be molded by vapor deposition of the selected material into a pre-etched mold formed in for instance a silicon wafer. The resulting molded components are then removed from their molds and may be bonded together with other components to produce the finished rotor.

The rotor 10 shown in FIGS. 1 to 3 may operate either as a compressor/pump or a turbine. In the case where the rotor is defined as the compressor/pump in a microturbomachine, the rotor is driven up to speed within a suitable housing by either electrical or mechanical means (not shown). It should be noted that the rotor 10 will operate with equal efficiency when driven in either a clock-wise or counter clockwise direction. Fluid upon entering inlet openings 18 and coming into contact with discs 12 and 13 is subjected to two forces, one acting tangentially in the direction of rotation, and the other radially outwardly. The combined effect of these tangential and radial forces is to propel the fluid with increasing velocity in a spiral path until it reaches the perimeter of the rotor where it is ejected. In the case where the rotor is operating as a turbine in a microturbomachine the operation described above is reversed. Thus, if fluid under pressure is admitted tangentially to the perimeter of the rotor disc, the rotor 10 will be set in motion by the viscous drag properties of the fluid which, travelling in a spiral path and with continuously diminishing velocity reaches the openings 18 from where it escapes.

Although a rotor 10 having two discs 12, 13 is depicted in FIGS. 1 to 3, it is to be understood that a plurality of more than two discs suitably serving particular operating requirements may be utilized. Similarly, rotor 30 of FIGS. 4 to 6 may have at least one further disc or ring additional to rings 36, 37.

As may be appreciated from FIGS. 1 to 3, stresses set up by centrifugal forces are supported radially by the star shaped hub 14 thus preventing a bending moment on the backing disc 16. Also, as illustrated in FIGS. 1 to 3, ends 26 of the star shaped hub 14 extending into the space 20 between the backing plate 16, and disc 12, and the space 21 between discs 12 and 13 in order to provide lateral support to the discs 12 and 13.

In contrast, in the second embodiment illustrated in FIGS. 4 to 6, the ends of the cross shaped hub 34 terminate below the outer diameter 48 of openings 38 thereby forming inner diameter 46 of spaces 40 and 41. The benefits with this embodiment are that disturbed fluid flow, caused by the ends 26 of the hub 14 of rotor 10 of the first embodiment, is able to be eliminated and the viscous drag flow is permitted to continue unimpeded to the openings 38.

A preferred material of construction for the rotor of the invention is silicon carbide. This material possesses the properties of high strength and dimensional stability (creep-resistance) at elevated temperatures and a high strength to density ratio. In the particular case of prior art bladeless turbine rotors where the major problems have always related to internal vibration, high temperatures, high speeds and high pressures it has been impractical to construct the rotor from silicon carbide thus limiting the high performance potential of turbine rotors operating on the principles of fluid viscous drag. The use of silicon carbide in a micro-gas turbine rotor of the present invention minimizes disc distortion and allows higher speeds and therefore improved performance. In addition, because the rotor is made by microfabrication techniques, an advantage is gained from the particular batch production methods available. In the case where microturbomachine rotors may operate at lower temperatures than micro-gas turbines the preferred material of construction may be silicon. This material is already in wide usage in microelectronic componentry and the fabrication techniques are well understood. Ceramics are excellent materials for microfabrication of highly stressed components because they demonstrate high tensile strength at very high temperatures.

In some applications of micromachinery, a relatively low level of thermal or mechanical stress may apply in which case the means of supporting the rings 12 and 13 as shown for rotor 10 in FIGS. 1 to 3 may be modified. The same may apply to rings 36 and 37 of rotor 30 shown in FIGS. 4 to 6.

Figure 7:
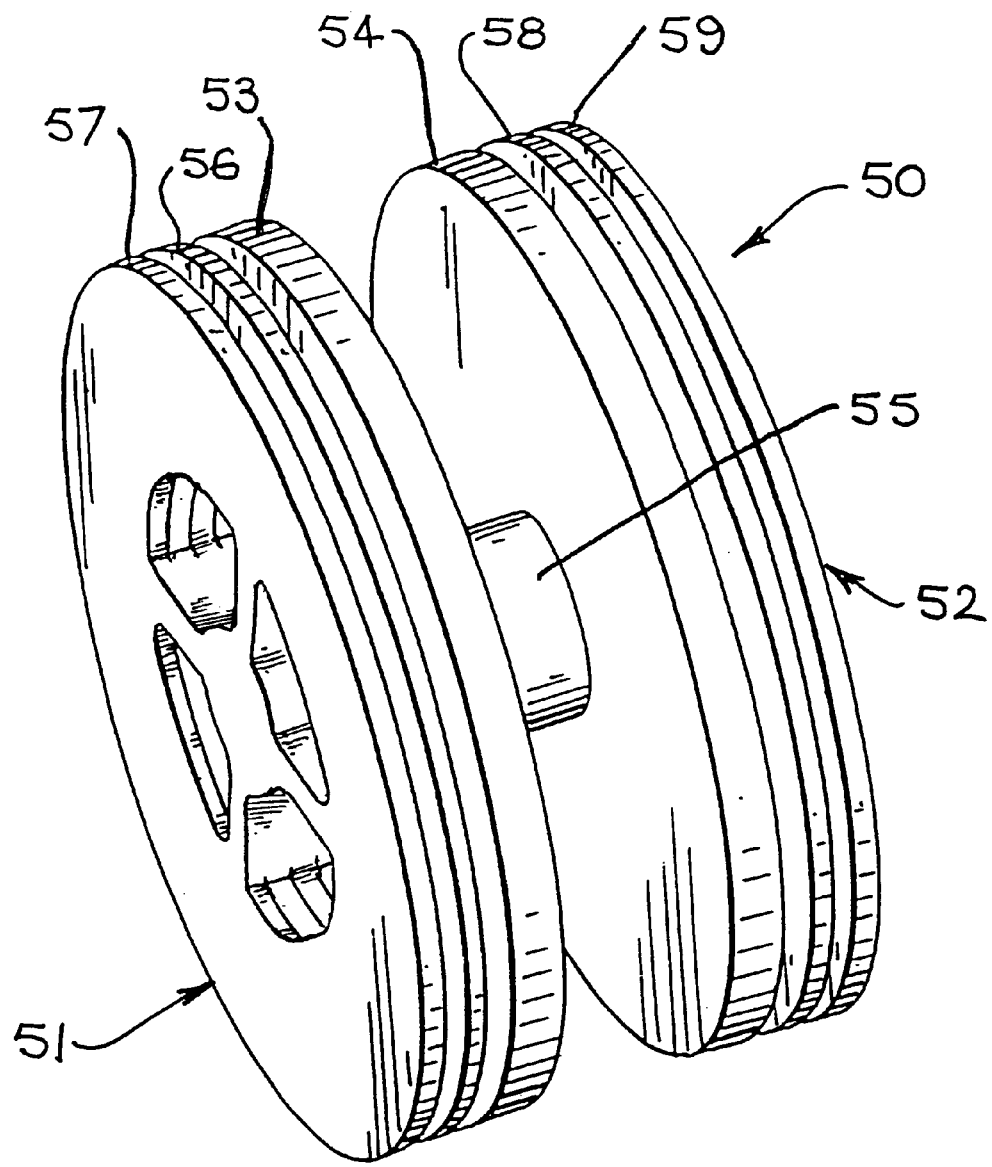
FIG. 7 is a three dimensional view illustrating two bladeless rotors mounted coaxially on a common shaft.

FIG. 7 is a perspective view of a micro-gas turbine rotor 50 of the present invention constructed according to Brayton cycle gas turbine practice. Rotor 50 has a radial outflow compressor unit 51 and a radial inflow turbine unit 52 each of which operates on the principles of fluid viscous drag. Units 51 and 52 are mounted by their respective support discs 53 and 54 to a respective end of a connecting shaft 55.

Each of the units 51 and 52 of rotor 50 of FIG. 7 has a general form similar to that of rotor 10 of FIGS. 1 to 3 and of rotor 30 of FIGS. 4 to 6. Detailed description of units 51 and 52 therefore is not necessary. However, as shown, the respective support discs 53 and 54 face each other along shaft 55. Thus, the rings 56 and 57 of unit 51 are adjacent to the surface of disc 53 which is remote from unit 52, while rings 58 and 59 are adjacent to the surface of disc 54 which is remote from unit 51.

Figure 8:
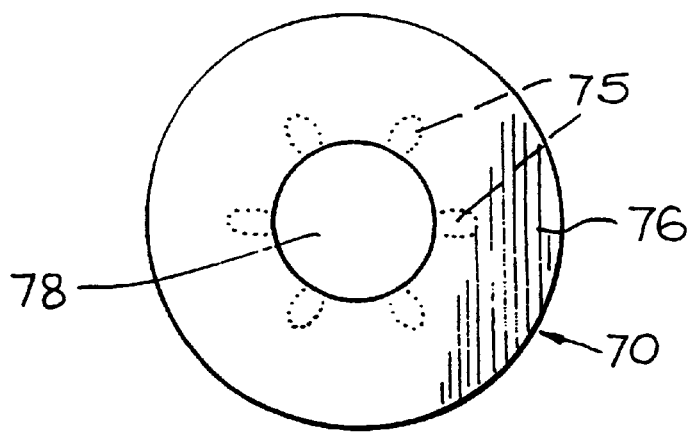
FIG. 8 is a front elevational view of a bladeless rotor in accordance with a third embodiment.
Figure 9:
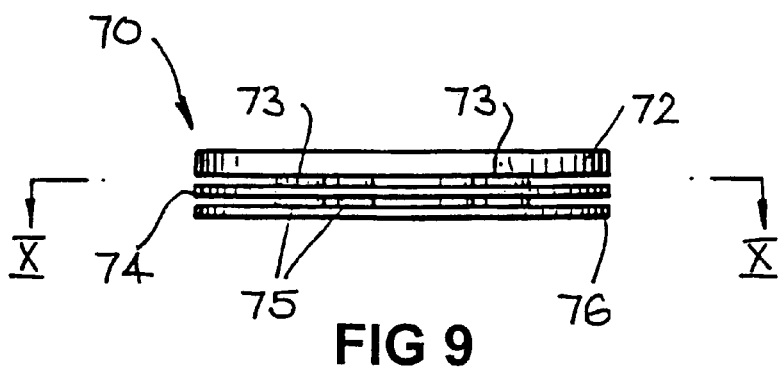
FIG. 9 is a side elevational view of the rotor of FIG. 8.
Figure 10:
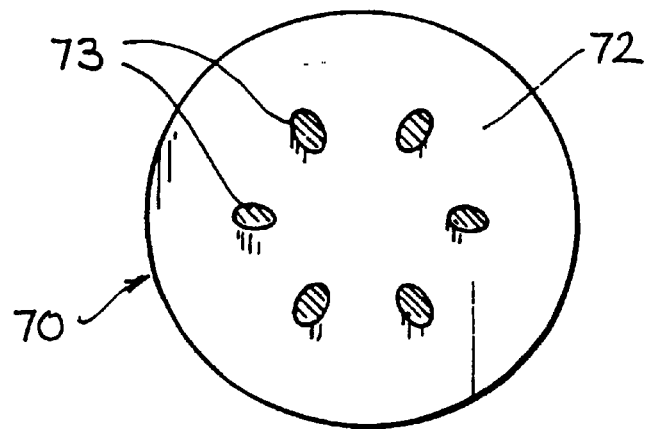
FIG. 10 is a sectional view of the rotor taken through the lines X—X of FIG. 9.

In FIGS. 8 to 10 there is shown an embodiment in which a micromachine rotor 70 comprises a support disc 72 upon which is mounted an array of spacers 73. Each of the spacers 73 is attached by a first face to support disc 72 and by the opposite face to ring 74. On the opposite face of ring 74 is mounted a further array of spacers 75 and these spacers attach to the inner face of ring 76. Although six spacers 73 and six spacers 75 of a particular size and shape are shown in the drawings it is to be understood that other numbers, sizes and shapes may be effective. In this particular embodiment of the invention of FIGS. 8 to 10, the advantage of the radial support given to the rings by the star shaped hub as shown in FIGS. 1 to 3 or a cross shaped hub as shown in FIGS. 4 to 6, respectively, is exchanged for the advantage of an unrestricted opening 78. This embodiment of FIGS. 8 to 10, like the first embodiment of FIGS. 1 to 3 and second embodiment of FIGS. 4 to 6, defines fluid passageways between the opening 78 and periphery of the rings 74 and 76.

The dimensions of rotor 70 as a whole, and the spacings of the disc 72 and rings 74 and 76, for any given machine will be determined by the conditions and requirements of the particular application of the micromachine, as with rotor 10 of FIGS. 1 to 3, rotor 30 of FIGS. 4 to 6 and rotor 50 of FIG. 7. In general, greater disc spacing is required for larger disc diameters, longer fluid spiral path and greater fluid viscosity. For instance, when the machine is configured as a turbine the torque is directly proportional to the square of the velocity of the fluid relative to the rotor and to the effective area of the discs, and inversely, to the distance separating them. The size and shape of the disc openings will also be determined dependent on application and rotor construction. In a multiple disc rotor, the disc furthest from the backing disc may have larger openings to not only accommodate the fluid out flow through the passage adjacent that disc, but also the fluid outflow from all other discs between the backing disc and furthest disc. Further, the surface finish of the discs is sufficiently smooth to adhere at least one layer of fluid particles to the disc thereby creating a boundary layer in the fluid vortex.

In its preferred forms, the present invention may provide the following advantages over the prior art-use of radial flow vanes in microturbomachines:
(a) reduced corner stress concentration;
(b) reduced turbulence and pulsation in the working fluids;
(c) higher rotational speeds within the limits of the tensile strength and elastic modulus of the material due to plain radial loading and absence of sharp section changes;
(d) an improved rotor balance;
(e) a reduction of the bending moment caused by centrifugal blade loading;
and in the case of prior art use of large scale bladeless rotors:
(f) no requirement for a multiplicity of parts; and
(g) minimized disc distortion due to a preferred material of construction giving high strength and dimensional stability at high temperatures e.g. silicon carbide or silicon.

The reduction or elimination of cyclic stresses that arise from reaction between blades and working fluids in prior art microturbine rotors, has the effect of achieving the advantages outlined in paragraph (b) above and, effectively, extending the fatigue life, or durability of the rotor in the present bladeless configuration.

Figure 12:
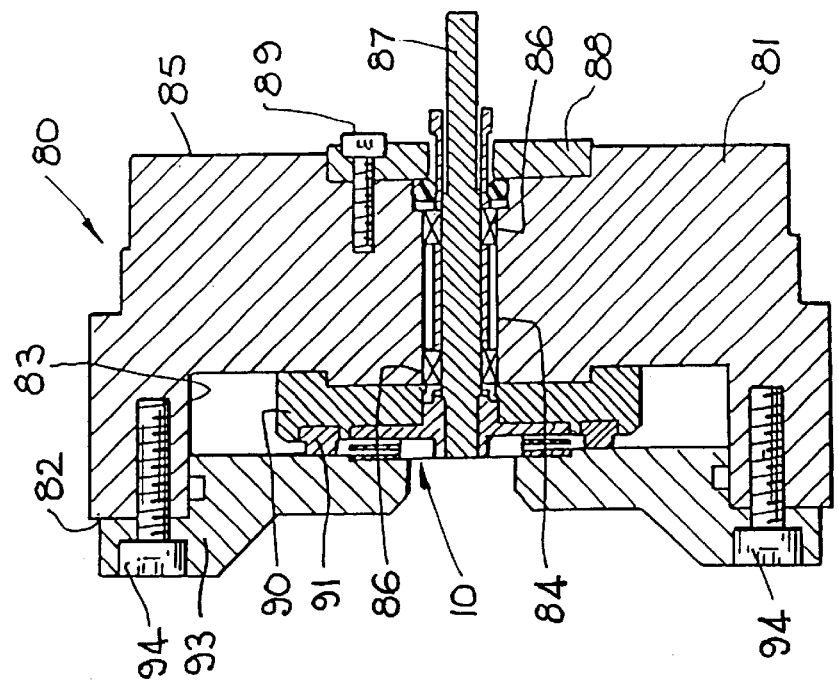
FIG. 12 is a cross sectional view taken along the lines XII—XII of FIG. 11.
Figure 11:
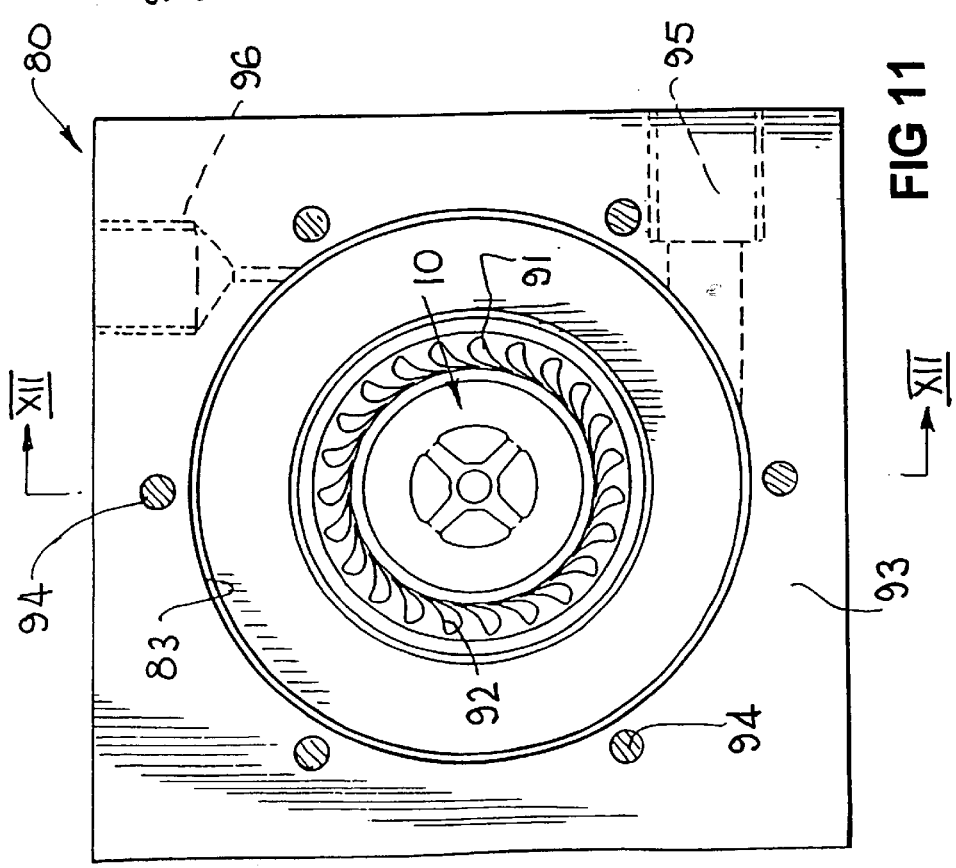
FIG. 11 is a front elevational view of a test rig illustrating operation of a radial flow turbine utilising a bladeless rotor.
Figure 14:
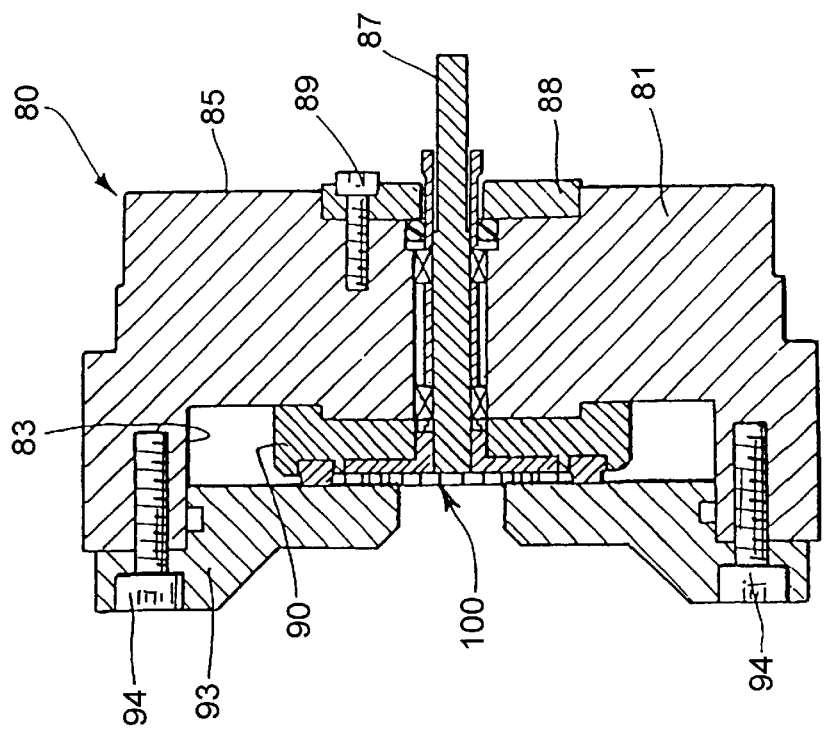
FIG. 14 is a cross sectional view taken along the lines XIV—XIV of FIG. 13.
Figure 13:
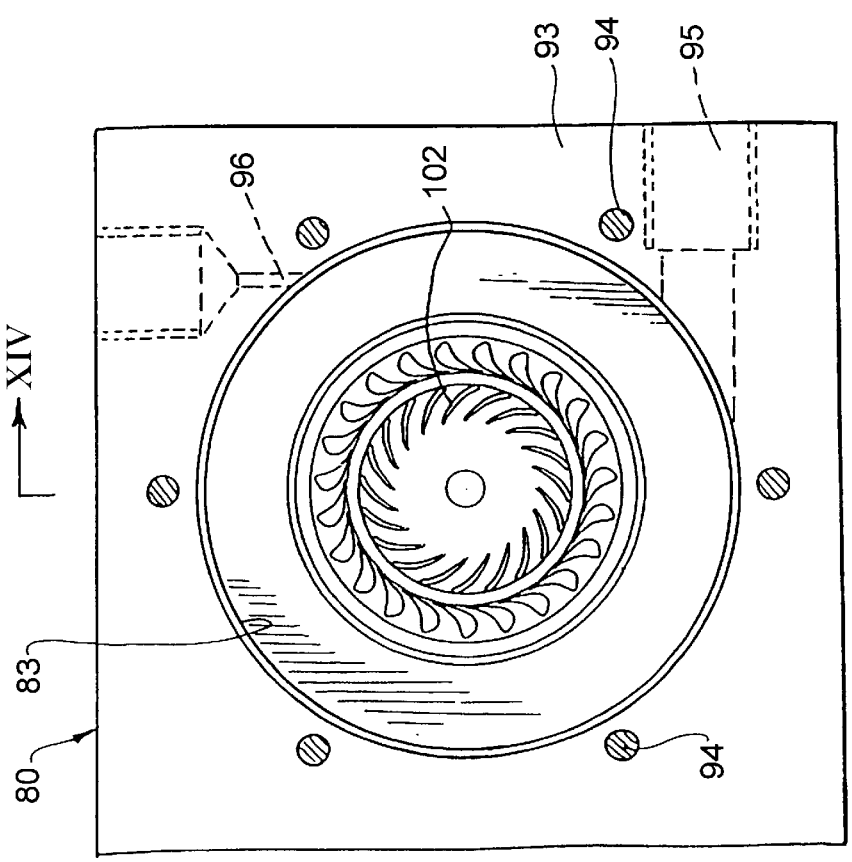
FIG. 13 is a front elevational view of a test rig illustrating operation of a radial flow turbine utilising a rotor with blades.

FIGS. 11 and 12 show a first test rig 80 for use in testing a bladeless rotor 10 as shown in FIGS. 1 to 3. FIGS. 13 and 14 show a second test rig 80, used in testing a bladed rotor 100 having blades 102. The respective rigs 80 of FIGS. 11 and 12 and of FIGS. 13 and 14 are identical, and they therefore have the same reference numerals and are described with reference to either one of them. The rotor 100 shown in FIGS. 13 and 14 has a construction modelled as closely as possible on the turbine rotors described in the M.I.T. patent.

The respective rigs 80 were used to demonstrate the efficiency of using a bladeless or vaneless rotor in a micromachine represented by a test rig 80 as shown in FIGS. 11 and 12 and, using a bladed rotor 100, in a test rig 80 as shown in FIGS. 13 and 14. That is, the purpose of rigs 80 was to demonstrate the performance of such machinery when used with a bladeless rotor 10 of the kind described above, as shown in FIGS. 11 and 12, compared with performance with a conventional bladed rotor 100, having blades 102 shown in FIGS. 13 and 14. For practical reasons a decision was made to construct a turbine with 18 mm diameter rotors 10 and 100 to be driven by compressed air. The use of compressed air meant that the turbine did not require the capacity to embrace high combustion temperatures and thus did not have to be made in high temperature resistant ceramic materials. Thus, the componentry was constructed of a readily available metal that has excellent qualities of machineability. An aluminium alloy 2011 was selected due to its characteristics of machineability and its high tensile strength. The choice of an 18 mm diameter rotor was selected also for ease of manufacture and to ensure that the rig can still be classed as a micromachine.

The rotor design follows the embodiment of rotor 30 as illustrated in FIGS. 4 to 6 but with all dimensions scaled in the ratio of 1:4.5. The spacing between the backing disc 32, and the disc 36, and between the discs 36 and 37, was 0.375 mm, whilst the thickness of the discs 36 and 37, was 0.375 mm. The distance between the working surfaces 44 and 45 was 1.125 mm.

As shown in FIGS. 11 to 14, each test rig 50 comprises a housing block 81 having a front face 82 with an annular recess 83. A cylindrical throughway 84 extends through the center of the block 81 from the center of the annular recess 83 to the rear face 85 of the block 81. The throughway 84 supports spaced bearings 86. In FIGS. 11 and 12, bladeless rotor 10 is shown as mounted at one end of a shaft 87 that is supported within the throughway 84 by the bearings 86 for axial rotation. The rear end 85 of the block 81 is closed off by an end plate 88 which is secured to the block by cap head screws 89. The annular recess 83 at the front of the block 81 supports an annular backing plate 90 that is positioned in close proximity to the rear of the bladeless rotor 10 in FIGS. 11 and 12 and the bladed rotor 100 in FIGS. 13 and 14. The bearing plate 89 supports an annular stator 91 having profiled blades 92. The respective stator 91 is positioned outside but close to the periphery of the rotor 10 or rotor 100 to direct incoming air to the rotor periphery. A front cover 93 is secured over the front of the housing by six cap head screws 94. Compressed air is used to drive the turbine and the air inlet 95 is positioned at the lower right hand side of the block as shown in each of FIGS. 11 and 13. The air initially fills the annular cavity around the periphery of the respective rotor 10 and 100 and then in the case of the bladeless rotor 10 flows through the fluid passageway defined by the rotor discs to impart viscous drag to rotate the rotor and then to escape via the apertures at the center of the rotor. The annular space exterior of each rotor is also coupled via a plenum chamber to a pressure sensor (not shown) via a bleed passageway 96 shown in FIGS. 11 and 13 in the top right hand corner of the block 81.

The radial inflow rotor 10, 100 mounted on the respective shaft 87 is supported by a respective high speed (140,000 rpm) ball bearing race, of each bearing 86, precisely located with identical preloads in both test rigs. The air is fed tangentially to the rotor by the air inlet 95. It is also fed to the plenum chamber that includes the pressure sensor. The respective multi-vaned stator 91 directs the air onto the rotor 10, 100 and each stator 91 also is modelled on the stator disclosed in the M.I.T. patent. The rigs 80 have identical exhaust apertures and the shaft 87 includes a bicoloured disc that allows the rotational speed of the shaft 87 to be read using an optical tachometer. The compressed air was regulated with coarse and fine needle valves to ensure fine flow control.

Figure 15:
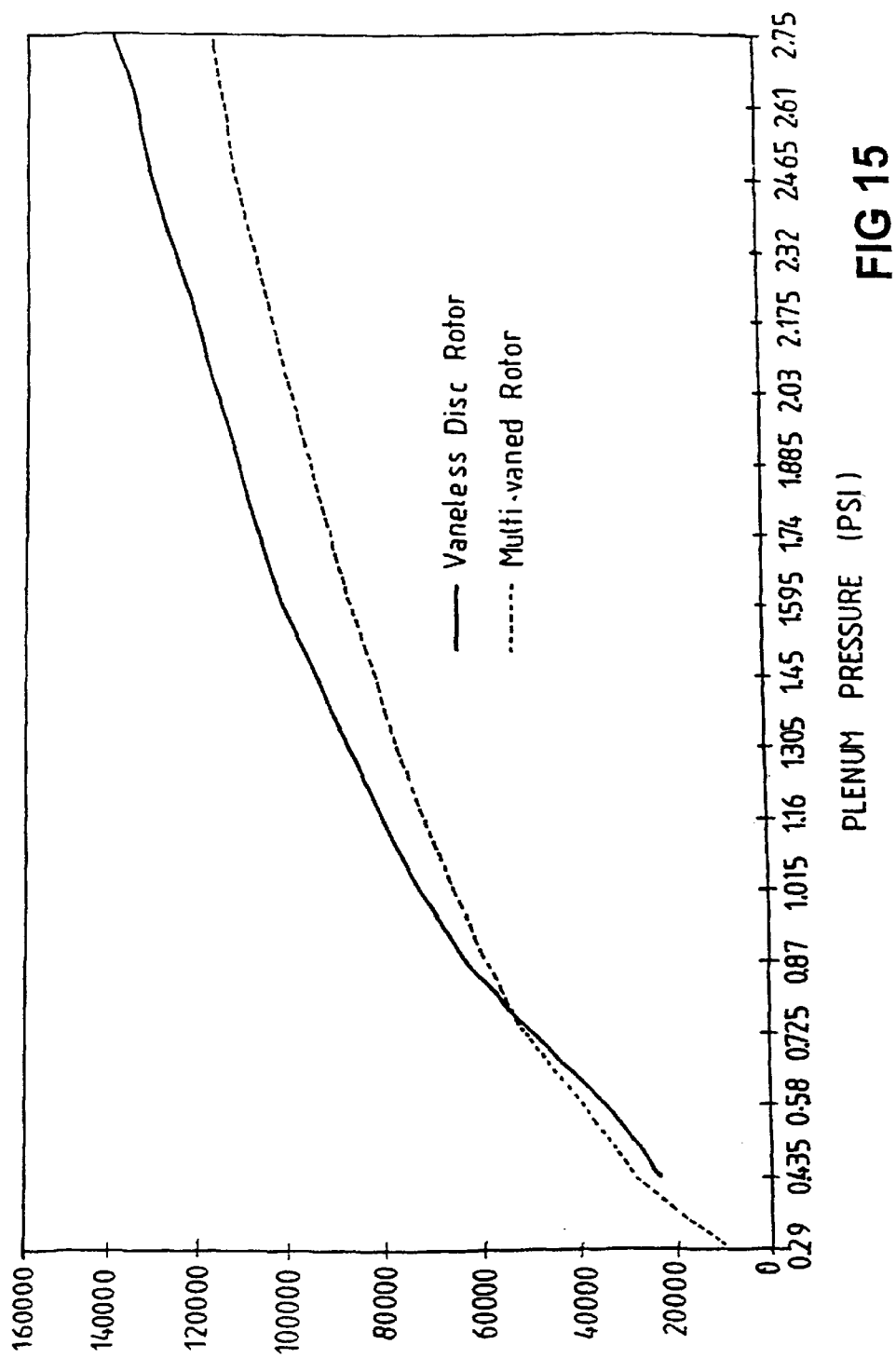
FIG. 15 is a graph of rotor speed against plenum chamber pressure utilising the test rigs of FIGS. 11 and 13.

Every care was taken to ensure that the two test rigs 80 operated on identical parameters. In one test, the revolutions per minute were measured against the plenum chamber pressure at precise change points to retrieve repeatable data. The pressure was increased slowly to ensure measurements represented stable conditions of air flow and rotor speed. Pressure was progressively increased until the ball bearing rpm specification limit for each bearing 86 was exceeded. The results of these test, namely rotor speed against supply pressure were plotted on the graph shown in FIG. 15.

The test rigs 80 were then used to conduct mass flow tests where rpm were measured against exhaust air speed. The pressure was increased slowly to ensure measurements represented stable conditions of air flow and rotor speed. Pressure was progressively increased until the ball bearing rpm specification limit was exceeded. The mass flow in grams per second was then derived from volume per second of exhaust air and a graph was plotted as shown in FIG. 16.

Figure 16:
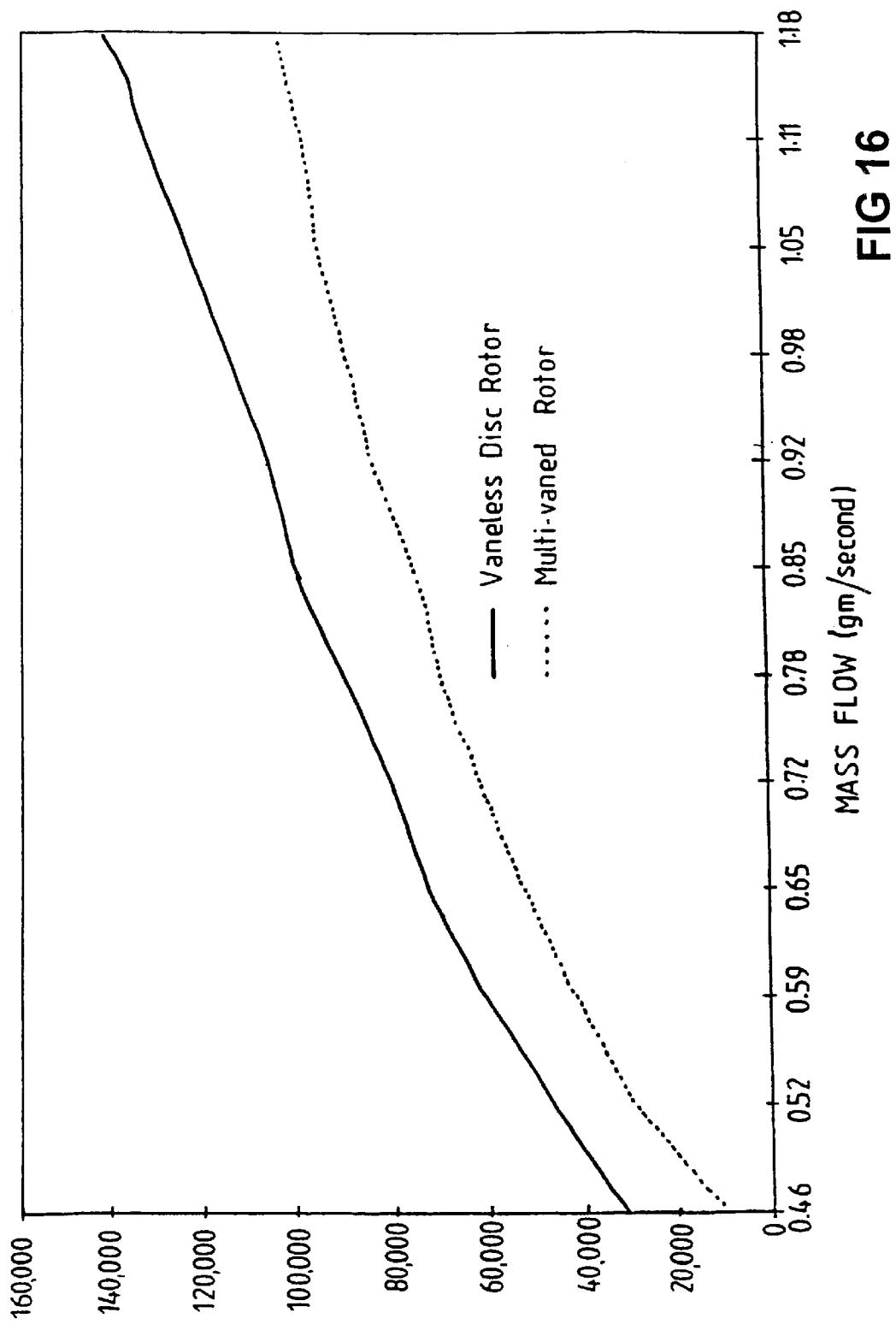
FIG. 16 is a graph of rotor speed against mass flow in grams per second.

It can be seen from the graphs of FIG. 16 there is a clear performance advantage in using the bladeless rotor 10, compared with the bladed rotor 100. The mass flow graphs diverged from approximately 40,000 rpm showing a strong trend to proportionately lower values, for bladeless rotor 10 compared to bladed rotor 100, at increasing rpm. The bladed rotor 100 registered a Mass Flow figure of 30% higher than the bladeless rotor 10 at 100,000 rpm. At maximum test Mass Flow, the bladeless rotor achieved approximately 35% higher rpm than the bladed rotor 100. The plenum pressure against rpm graph showed a similar strong trend favouring the bladeless rotor 10. From approximately 50,000 rpm the bladeless rotor 10 achieved higher speeds than the bladed rotor 100 and this divergence increased until 140,400 rpm which was just over the specification limit of the bearings. This speed was reached at only 2.75 pounds force per square inch (psi) an improvement of 18.5% over the bladed rotor 100. Additionally, a 27% higher pressure was required in order for the bladed rotor 100 to reach 100,000 rpm. The divergent trends of both the graphs are indicative of major performance benefits that would be expected to increase proportionally at higher rpm's.

A further advantage that was noted in using the two test rigs 80 was that the bladeless rotor 10 was considerably quieter than the bladed rotor 100.

It will be appreciated by persons skilled in the art that numerous variations and/or modifications may be made to the invention as shown in the specific embodiments without departing from the spirit or scope of the invention as broadly described. The present embodiments are, therefore, to be considered in all aspects as illustrative and not restrictive.

What is claimed is:

1. A micromachine including at least one bladeless rotor, said rotor being adapted to impart energy to or derive energy from a fluid, and wherein the rotor has a disc of a diameter no greater than 20 mm.

2. The micromachine according to claim 1, wherein a vaned stator is positioned around the periphery of the bladeless rotor.

3. The micromachine according to claim 1, wherein the machine is made of materials capable of operating at temperatures greater than 1000° C.

4. The micromachine according to claim 1, wherein the rotor includes a shaft centrally supporting at least two closely spaced planar discs, the discs having opposed surfaces defining a fluid passageway.

5. The micromachine according to claim 4, wherein the discs are separated by spacers.

6. The micromachine according to claim 4, wherein at least one of the discs has one or more apertures to allow fluid to pass into or out of the fluid passageway.

7. The micromachine according to claim 6, wherein the apertures are close to the central region of the disc.

8. The micromachine according to claim 6, wherein there are two or more apertured discs, the apertures of each disc being aligned with those of the other disc.

9. The micromachine according to claim 1, wherein the rotor includes a backing disc supporting a plurality of annular discs in a closely spaced coaxial array.

10. The micromachine according to claim 9, wherein each annular disc is mounted to the backing disc or an adjacent disc by an array of spacers.

11. The micromachine according to claim 9, wherein the backing disc is mounted coaxially on a shaft.

12. A micromachine including at least one bladeless rotor, said rotor being adapted to impart energy to or derive energy from a fluid, and wherein the rotor is made of a material having a tensile strength to allow the rotor to run at speeds greater than 500,000 rpm at elevated temperatures associated with combustion.

13. The micromachine according to claim 12, wherein the rotor is formed at least in part from a material selected from silicon, silicon carbide, silicon coated with silicon carbide, and silicon coated with silicon nitride.

14. A micromachine including at least one bladeless rotor, said rotor being adapted to impart energy to or derive energy from a fluid, and wherein the rotor is made of a single crystal material.

15. A micromachine including at least one bladeless rotor, said rotor being adapted to impart energy to or derive energy from a fluid, and wherein the rotor is formed by a microfabrication technique.

16. The micromachine according to claim 15, wherein the rotor is formed by photolithography.

17. The micromachine according to claim 15, wherein the rotor is formed by vapour deposition.

18. A rotor for a micromachine, wherein the rotor includes at least a pair of closely spaced co-axially aligned discs defining opposed planar surfaces, at least one disc having at least one aperture whereby a fluid passageway is defined between the aperture, the planar surfaces and the periphery of the rotor, and wherein the rotor is bladeless and is formed of a single crystal material.

19. A rotor for a micromachine, wherein the rotor includes at least a pair of closely spaced co-axially aligned discs defining opposed planar surfaces, at least one disc having at least one aperture whereby a fluid passageway is defined between the aperture, the planar surfaces and the periphery of the rotor, and wherein the rotor is manufactured of a material having a tensile strength to allow the rotor to run at speeds greater than 500,000 rpm at elevated temperatures associated with combustion.

20. The rotor according to claim 18 or claim 19, wherein the rotor is of unitary construction.

21. The rotor according to claim 18 or claim 19, wherein the rotor has a disc of a diameter no greater than 20 mm.

22. The rotor according to claim 18 or claim 19, wherein the rotor includes a shaft centrally supporting said discs.

23. The rotor according to claim 18 or claim 19, wherein the at least one aperture is close to a central region of at least one of said dics.

24. The rotor according to claim 18 or claim 19, wherein there are at least two discs each having at least one aperture, with the at least one aperture of each disc being aligned with each other.

25. The rotor according to claim 18 or claim 19, wherein the discs are separated by spacers.

26. The rotor according to claim 18 or claim 19, wherein the rotor is made of material capable of operating at temperatures greater than 1000° C.

27. The rotor according to claim 18 or claim 19, wherein the rotor is made of a material having a tensile strength to allow the rotor to run at speeds greater than 500,000 rpm at elevated temperatures associated with combustion.

28. The rotor according to claim 19, wherein the rotor is made of a single crystal material.

29. The rotor according to claim 18 or claim 19, wherein the rotor is formed at least in part from a material selected from silicon, silicon carbide, silicon coated with silicon carbide, and silicon coated with silicon nitride.

30. The rotor according to claim 18 or claim 19, wherein the rotor includes a backing disc supporting a plurality of annular discs in a closely spaced coaxial array.

31. The rotor according to claim 30, wherein each annular disc is mounted to the backing disc or an adjacent disc by an array of spacers.

32. The rotor according to claim 30, wherein the backing disc is mounted coaxially on a shaft.

33. The mircomachine according to claim 18 or claim 19, wherein the rotor is formed by a microfabrication technique.

34. The micromachine according to claim 33, wherein the rotor is formed by photolithography.

35. The micromachine according to claim 33, wherein the rotor is formed by vapour deposition.

36. A rotor for a micromachine, wherein the rotor includes a backing disc and at least one co-axially spaced annular disc supported on the backing disc by a central hub defining at least one aperture, wherein the rotor is bladeless and the annular disc defines an unimpeded fluid passage between the aperture and the periphery of the disc, and wherein the rotor is made of a material having a tensile strength to allow the rotor to run at speeds greater than 500,000 rpm at elevated temperatures associated with combustion.

37. The rotor according to claim 36, wherein the rotor is formed at least in part from a material selected from silicon, silicon carbide, silicon coated with silicon carbide, and silicon coated with silicon nitride.

38. A rotor for a micromachine, wherein the rotor includes a backing disc and at least one coaxially spaced annular disc supported on the backing disc by a central hub defining at least one aperture, wherein the rotor is bladeless and the annular disc defines an unimpeded fluid passage between the aperture and the periphery of the disc, and wherein the rotor is made of a single crystal material.

39. A rotor for a micromachine, wherein the rotor includes a backing disc and at least one coaxially spaced annular disc supported on the backing disc by a central hub defining at least one aperture, wherein the rotor is bladeless and the annular disc defines an unimpeded fluid passage between the aperture and the periphery of the disc, and wherein the rotor is formed by a microfabrication technique.

40. A rotor for a micromachine, wherein the rotor includes a backing disc and at least one coaxially spaced annular disc supported on the backing disc by a central hub defining at least one aperture, wherein the rotor is bladeless and the annular disc defines an unimpeded fluid passage between the aperture and the periphery of the disc, and wherein the rotor is formed by photolithography.

41. A rotor for a micromachine, wherein the rotor includes a backing disc and at least one coaxially spaced annular disc supported on the backing disc by a central hub defining at least one aperture, wherein the rotor is bladeless and the annular disc defines an unimpeded fluid passage between the aperture and the periphery of the disc, and wherein the rotor is formed by vapour deposition.

* * * * *